(12) United States Patent
Sato

(10) Patent No.: US 10,978,714 B2
(45) Date of Patent: Apr. 13, 2021

(54) FUEL BATTERY CELL

(71) Applicant: NISSAN MOTOR CO., LTD., Yokohama (JP)

(72) Inventor: Kazuyuki Sato, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/634,676

(22) PCT Filed: Jul. 31, 2017

(86) PCT No.: PCT/JP2017/027733
§ 371 (c)(1),
(2) Date: Jan. 28, 2020

(87) PCT Pub. No.: WO2019/026138
PCT Pub. Date: Feb. 7, 2019

(65) Prior Publication Data
US 2020/0381740 A1 Dec. 3, 2020

(51) Int. Cl.
*H01M 8/0247* (2016.01)
*H01M 8/1213* (2016.01)
*H01M 4/86* (2006.01)

(52) U.S. Cl.
CPC ....... *H01M 4/8621* (2013.01); *H01M 8/0247* (2013.01); *H01M 8/1213* (2013.01)

(58) Field of Classification Search
CPC ............. H01M 8/0202; H01M 8/0206; H01M 8/0208; H01M 8/021; H01M 8/0213; H01M 8/0232; H01M 8/0247
See application file for complete search history.

(56) References Cited

U.S. PATENT DOCUMENTS

| | | |
|---|---|---|
| 2003/0031915 A1 | 2/2003 | Diez et al. |
| 2010/0173217 A1 | 7/2010 | Brandner et al. |
| 2011/0104586 A1 | 5/2011 | Tucker et al. |
| 2016/0093900 A1 | 3/2016 | Brandner et al. |
| 2016/0111732 A1 | 4/2016 | Franco et al. |

FOREIGN PATENT DOCUMENTS

| | | |
|---|---|---|
| JP | 2005-158297 A | 6/2005 |
| JP | 2010-534901 A | 11/2010 |
| JP | 2011-518416 A | 6/2011 |
| JP | 2016-519413 A | 6/2016 |

*Primary Examiner* — Stephan J Essex
(74) *Attorney, Agent, or Firm* — Foley & Lardner LLP

(57) ABSTRACT

A fuel battery cell comprising a battery structure 1 and a support plate 2, the battery structure 1 having a power generation region G of a lamination of an anode electrode layer 4, an electrolyte layer 5, and a cathode electrode layer 6, and the support plate 2 being made of metal, being disposed on the anode electrode layer 4 side of the battery structure 1, in which the support plate 2 integrally includes a main body part 2A and a frame part 2B, the main body part 2A having gas permeability, the frame part 2B having gas impermeability and having small thickness, the support plate 2B has a step surface 2D between the main body part 2A and the frame part 2B, on the surface on the anode electrode layer 4 side, and the electrolyte layer 5 is disposed in a way it extends to the step surface 2D and the frame part 2B, is provided. A risk of application of a tensile load to the electrolyte layer 5 is removed, when the support plate 2 thermally expands during power generation, whereby a good gas barrier property at an end part of the battery structure 1 is maintained.

11 Claims, 11 Drawing Sheets

FUEL BATTERY CELL

TECHNICAL FIELD

The present invention relates to a fuel battery cell including a battery structure with a lamination of an anode electrode layer, an electrolyte layer, and a cathode electrode layer, and a support plate that is made of metal and that supports the battery structure.

BACKGROUND ART

As a conventional fuel battery cell, one described in Patent Document 1 is known. The fuel battery cell disclosed in Patent Document 1 includes a plate (a support plate), which is produced by powder metallurgy. The plate has a porous base plate region and an air-tight end region. This plate is formed integrally with the air-tight end region by compressing an end part of a sintered flat porous body using a press die.

In the fuel battery, a battery layer having electrochemical activity is attached to the porous base plate region on a flat surface of the plate, that is, on a surface in which the porous base plate region and the end region continue on the same plane. The fuel battery has a structure, in which an air-tight electrolyte layer constituting the battery layer extends to the end region, thereby securing a gas barrier property at an end part of the battery layer. Such a fuel battery is typically manufactured by successively forming battery structures, each of the battery structure being formed by successively laminating an anode electrode layer, an electrolyte layer, and a cathode electrode layer on the plate.

CITATION LIST

Patent Document

Patent Document 1: JP 2010-534901T

SUMMARY OF INVENTION

Technical Problem

In a fuel battery cell as described above, the support plate (plate), which has the air-tight end region integrated with an outer periphery of the porous base plate region, has a structure-changed region due to changes in thickness, changes in void fraction (porosity), and changes in strength, and heat history during a manufacturing process, and the like, between the porous base plate region and the end region. Therefore, a conventional fuel battery cell has a risk of application of an excessive load that can cause a crack and the like in the electrolyte layer at the time the support plate expands or contracts in accordance with power generation or stoppage (heat generation or cooling). For this reason, an improvement is necessary to enhance a gas barrier property at an end part of the battery structure.

The present invention has been made to solve the above-described problem by focusing on the lower resistance of the electrolyte layer against a tensile load than a compressive load. An object of the present invention is to provide a fuel battery cell in which a risk of application of a tensile load to an electrolyte layer is removed, in particular when a support plate contracts after power generation is stopped, whereby occurrence of a crack and the like in the electrolyte layer are prevented beforehand, and a good gas barrier property at an end part of a battery structure is maintained.

Solution to Problem

The fuel battery cell according to the present invention includes a battery structure and a support plate that is made of metal. The battery structure has a power generation region of a lamination of an anode electrode layer, an electrolyte layer, and a cathode electrode layer. The support plate made of metal is disposed on the anode electrode layer side of the battery structure to support the battery structure. The support plate integrally includes a main body part at a center and a frame part at an outer periphery of the main body part. The main body part has gas permeability and is in contact with the power generation region of the anode electrode layer. The frame part has gas impermeability and has a smaller thickness than a thickness of the main body part. The support plate has a step surface between the main body part and the frame part, on a surface on the anode electrode layer side. In the fuel battery cell, the electrolyte layer of the battery structure is disposed in a way it extends to an outer periphery side of the power generation region and reaches the step surface and the frame part.

Advantageous Effects of Invention

The fuel battery cell according to the present invention thermally expands as a whole during power generation. However, when the support plate contracts after the power generation is stopped, the support plate, which has the step surface on the surface on the anode electrode layer side, is displaced to curve in a way that the step surface is on the inner side of the curve, because contraction amounts on the both surface sides differ from each other due to difference in the surface areas. Therefore, a compressive load occurs on the step surface side, and a tensile load occurs on the opposite surface in the fuel battery cell. In these conditions, in the fuel battery cell, the battery structure is disposed on the step surface side of the support plate while the electrolyte layer is disposed in a way it extends to the step surface and the frame part having gas impermeability, whereby a tensile load is not applied to the electrolyte layer. Therefore, a gas barrier property is secured between the electrolyte layer and the frame part.

Thus, in the fuel battery cell, a risk of application of a tensile load to the electrolyte layer is removed, when the support plate contracts after power generation is stopped, whereby occurrence of a crack and the like in the electrolyte layer are prevented beforehand, and a good gas barrier property at the end part of the battery structure can be maintained.

DESCRIPTION OF EMBODIMENTS

First Embodiment

Figure 1:
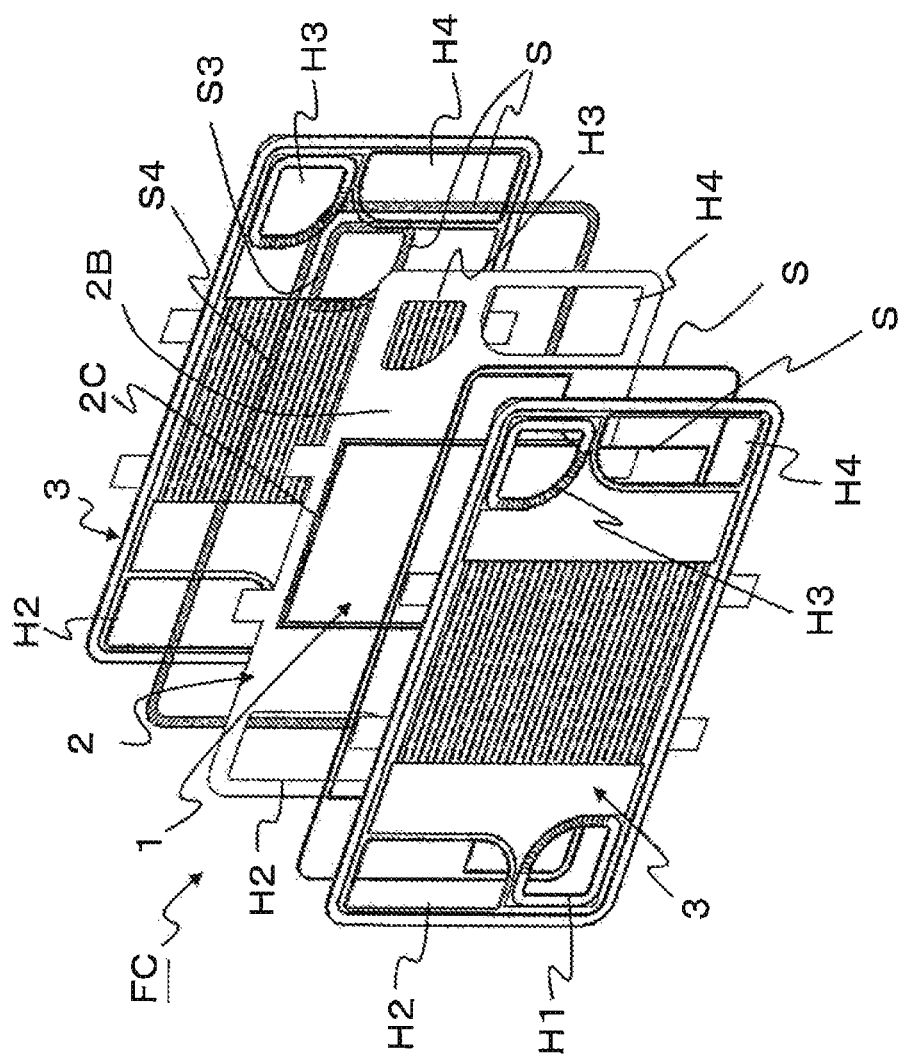
FIG. 1 is an exploded perspective view of a fuel battery cell for illustrating a first embodiment of the present invention.

A fuel battery cell FC illustrated in FIG. 1 is, for example, a solid oxide fuel battery, and includes a battery structure 1, a support plate 2 that is made of metal and that supports the battery structure 1, and a pair of separators 3, 3 that form a gas channel between the battery structure 1 and the support plate 2. This fuel battery cell FC may be referred to as a "metal-supported cell", because mechanical strength is increased while gas permeability is secured by the support plate 2.

Figure 2A:
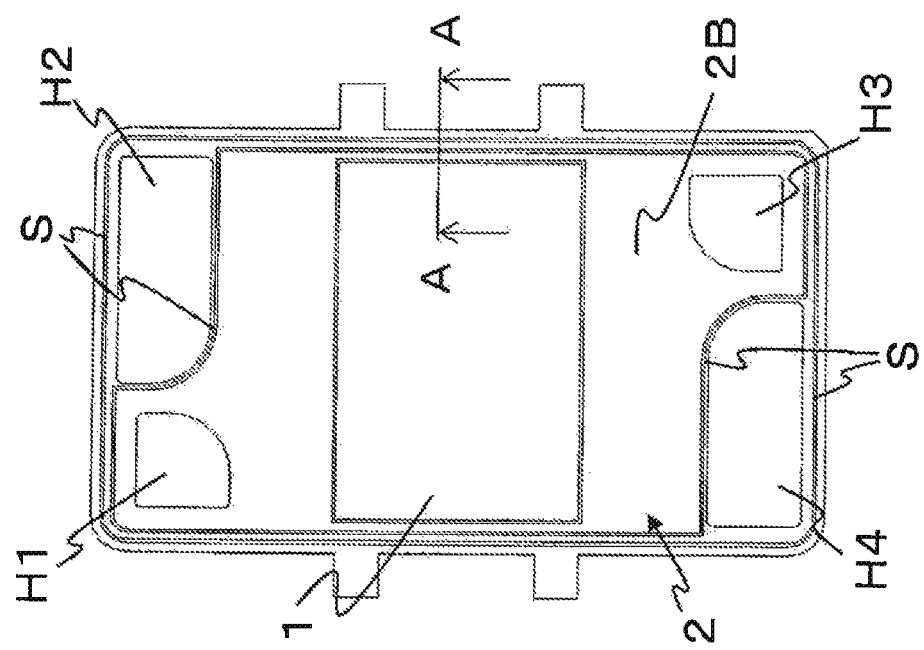
FIG. 2A is a plane view of the fuel battery cell.
Figure 2B:
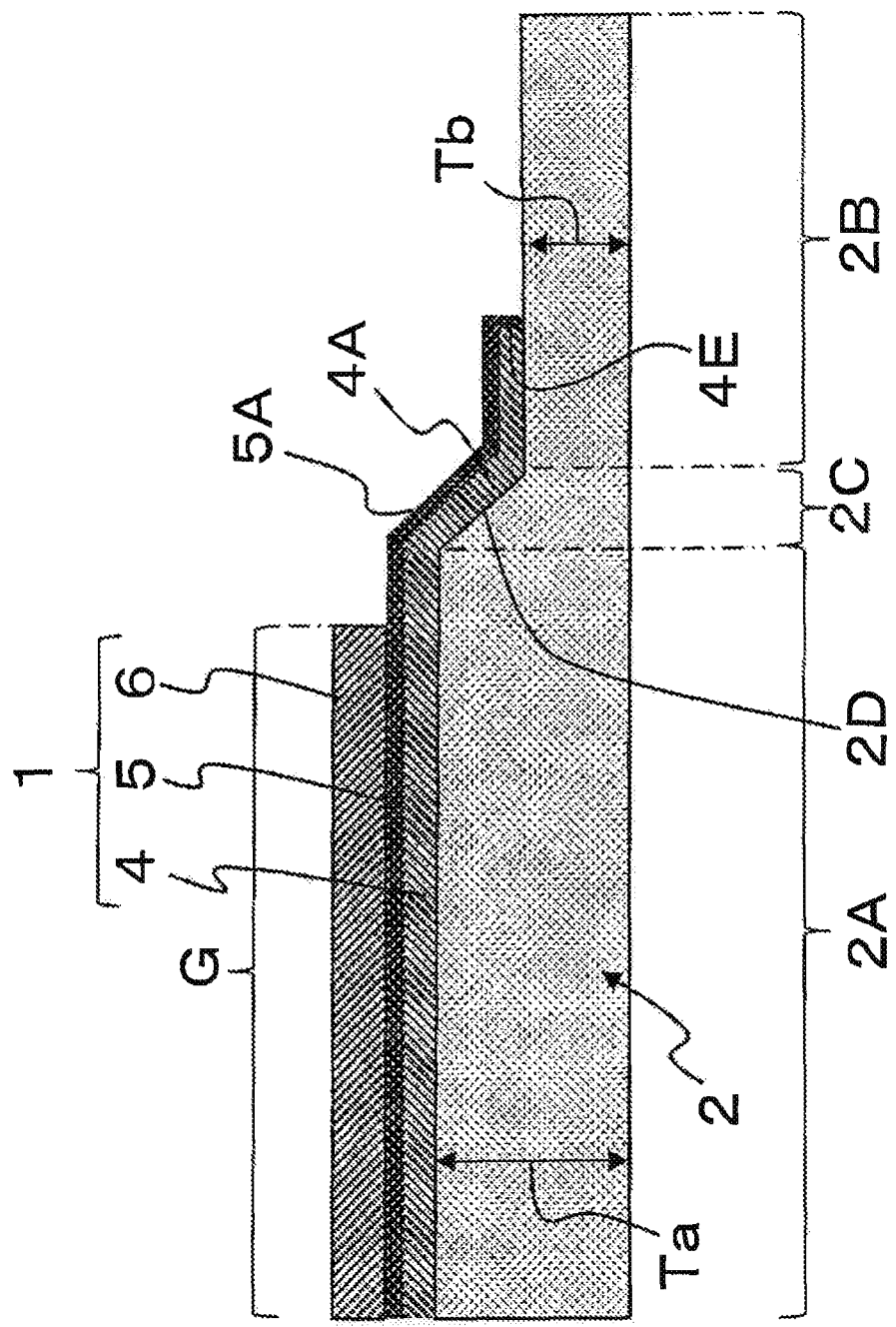
FIG. 2B is a sectional view taken along line A-A in FIG. 2A.

As illustrated in FIGS. 2A and 2B, the battery structure 1 has a lamination of an anode electrode layer (fuel electrode layer) 4, an electrolyte layer 5 comprising solid electrolyte, and a cathode electrode layer (air electrode layer) 6 in this order, from a lower side in the figure. The region in which the three layers 4 to 6 overlap on one another is a power generation region G having electrochemical activity.

In a solid oxide fuel battery cell, for example, the anode electrode layer 4 uses a cermet of nickel and yttria-stabilized zirconia, the electrolyte layer 5 uses 8 mol % yttria-stabilized zirconia, and the cathode electrode layer 6 uses lanthanum strontium manganite.

The support plate 2 made of metal may be disposed on either of the electrode layers 4 and 6 sides, when it is disposed in order to reinforce strength of the battery structure 1. However, the support plate 2 is disposed on the anode electrode layer 4 side of the battery structure 1 to prevent oxidation. The support plate 2 integrally includes a main body part 2A at a center and a frame part 2B at an outer periphery of the main body part 2B. The main body part 2A has gas permeability and is in contact with the power generation region G of the anode electrode layer 4. The frame part 2B has gas impermeability and has relatively a small thickness Tb with respect to the thickness Ta of the main body part 2A. The support plate 2 has a step surface 2D between the main body part 2A and the frame part 2B on a surface on the anode electrode layer 4 side.

The support plate 2 of this embodiment includes an intermediate part 2C that continuously connects the main body part 2A and the frame part 2B. The thickness of the intermediate part 2C continuously decreases from the main body part 2A to the frame part 2B. Due to this, the step surface 2D of the support plate 2 is inclined from the main body part 2A to the frame part 2B.

The support plate 2 is made of a porous metal material, such as foamed metal. By applying pressure to a peripheral part of the porous metal material, for example, by press working, a porous composition still remains in a center part, and it serves as the main body part 2A having gas permeability. In the support plate 2, the pressurized peripheral part having a dense composition serves as the frame part 2B having gas impermeability. Thus, the support plate 2 integrally includes the main body part 2A and the thinned frame part 2B. Moreover, the support plate 2 of this embodiment has the intermediate part 2C and the step surface 2D on one surface side. The opposite surface is a flat surface, in which the main body part 2A, the intermediate part 2C, and the frame part 2B continue on the same plane.

In this fuel battery cell FC, the electrolyte layer 5 of the battery structure 1 is disposed in a way it extends to an outer periphery side of the power generation region G and reach the step surface 2D and the frame part 2B. The extended part of the electrolyte layer 5 is referred to as an "outer peripheral edge part 5A".

In this embodiment, as with the electrolyte layer 5, the anode electrode layer 4 of the battery structure 1 has an outer peripheral edge part 4A that is disposed in a way it extends to the outer periphery side of the power generation region G along the step surface 2D and the frame part 2B. In the fuel battery cell FC, the outer peripheral edge part 5A of the electrolyte layer 5 covers the outer peripheral edge part 4A of the anode electrode layer 4 and also covers a peripheral end surface 4E of the outer peripheral edge part 4A of the anode electrode layer 4 in the frame part 2B.

Moreover, in the fuel battery cell FC, the thickness of the anode electrode layer 4 is set such that a thermal expansion amount of the anode electrode layer 4 is equivalent to the thermal expansion amount of the intermediate part 2C of the support plate 2, and the thicknesses of the anode electrode layer 4 at the power generation region G and at the outer peripheral edge part 4A are the same. In other words, the thickness of the anode electrode layer 4, by which the anode electrode layer 4 has the thermal expansion amount equivalent to the thermal expansion amount of the intermediate part 2C, is a thickness that provides a displacement amount equivalent to the displacement amount (deformation amount) of the intermediate part at the time the support plate 2 thermally expands.

In the fuel battery cell FC, the cathode electrode layer 6 of the battery structure 1 is provided to the support plate 2 in a range of the main body part 2A and is provided only in the range of the main body part 2A in the example illustrated in the figure. Due to this, the fuel battery cell FC has the power generation region G, which comprises the three layers 4 to 6 of the battery structure 1, within the range of the main body part 2A of the support plate 2 and has the outer peripheral edge parts 4A and 5A of the anode electrode layer 4 and the electrolyte layer 5 disposed along the step surface 2D and the frame part 2B.

In the fuel battery cell FC having the configuration described above, the support plate 2 having the battery structure 1, and the pair of the separators 3, 3 have rectangular shapes with approximately the same longitudinal and lateral dimensions, as illustrated in FIG. 1. In the fuel battery cell FC, a gas channel for circulating cathode gas (air) is formed between one separator 3 and the cathode electrode layer 6 of the battery structure 1 and a gas channel for circulating anode gas (fuel gas) is formed between the other separator 3 and the anode electrode layer 4/the support plate 2.

The fuel battery cell FC includes a manifold hole H1 for supplying the anode gas and a manifold hole H2 for discharging the cathode gas that are formed on one short side of the support plate 2 and the pair of the separators 3, 3. A manifold hole H3 for discharging the anode gas and a manifold hole H4 for supplying the cathode gas are formed on the other short side.

These manifold holes H1 to H4 communicate with each other to form manifolds for circulating the respective gases when the battery structure 1 and the separators 3 are laminated to assemble a fuel battery cell stack. When the fuel battery cell stack is assembled, the battery structures 1 adjacent in the stacking direction share one separator 3 between them.

Moreover, in the fuel battery cell FC, a sealing member S is provided between outer peripheral parts of the support plate 2 and each of the separators 3 and around the manifold holes H1 to H4, thereby air-tightness of the gas channels is secured. However, the sealing member S is not disposed around the manifold holes H1 to H4 or an open part is provided in a part of the sealing member S, in order to allow the gas corresponding to the respective gas channel to circulate.

The fuel battery cell FC generates electrical energy due to electrochemical reaction in the power generation region G, by supplying the anode gas to the anode electrode layer 4 of the battery structure 1 and also supplying the cathode gas to the cathode electrode layer 6. At this time, the anode gas is supplied to the anode electrode layer 4 through the main body part 2A having gas permeability in the support plate 2.

Here, a manufacturing process of this fuel battery cell FC is described based on FIGS. 3A, 3B, 3C and 3D.

Figure 3A:
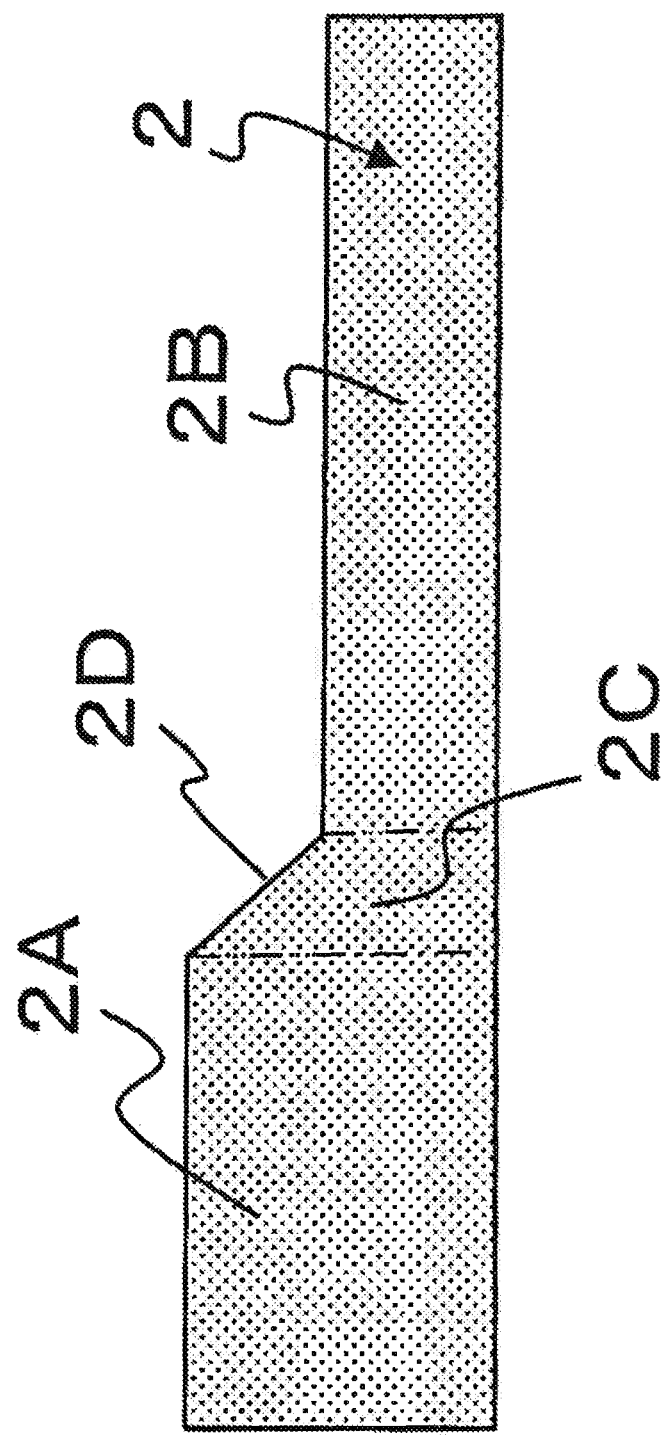
FIGS. 3A, 3B, 3C and 3D are sectional views for illustrating a manufacturing process of the fuel battery cell.

The support plate 2 illustrated in FIG. 3A includes the main body part 2A, the frame part 2B, the intermediate part 2C, and the inclined step surface 2D that are integrally formed by applying pressure to a part of a porous metal material, as described above. The support plate 2 has an opposite surface with no step surface 2D, which is a flat surface on which the main body part 2A, the frame part 2B, and the intermediate part 2C continue on the same plane.

Figure 3B:
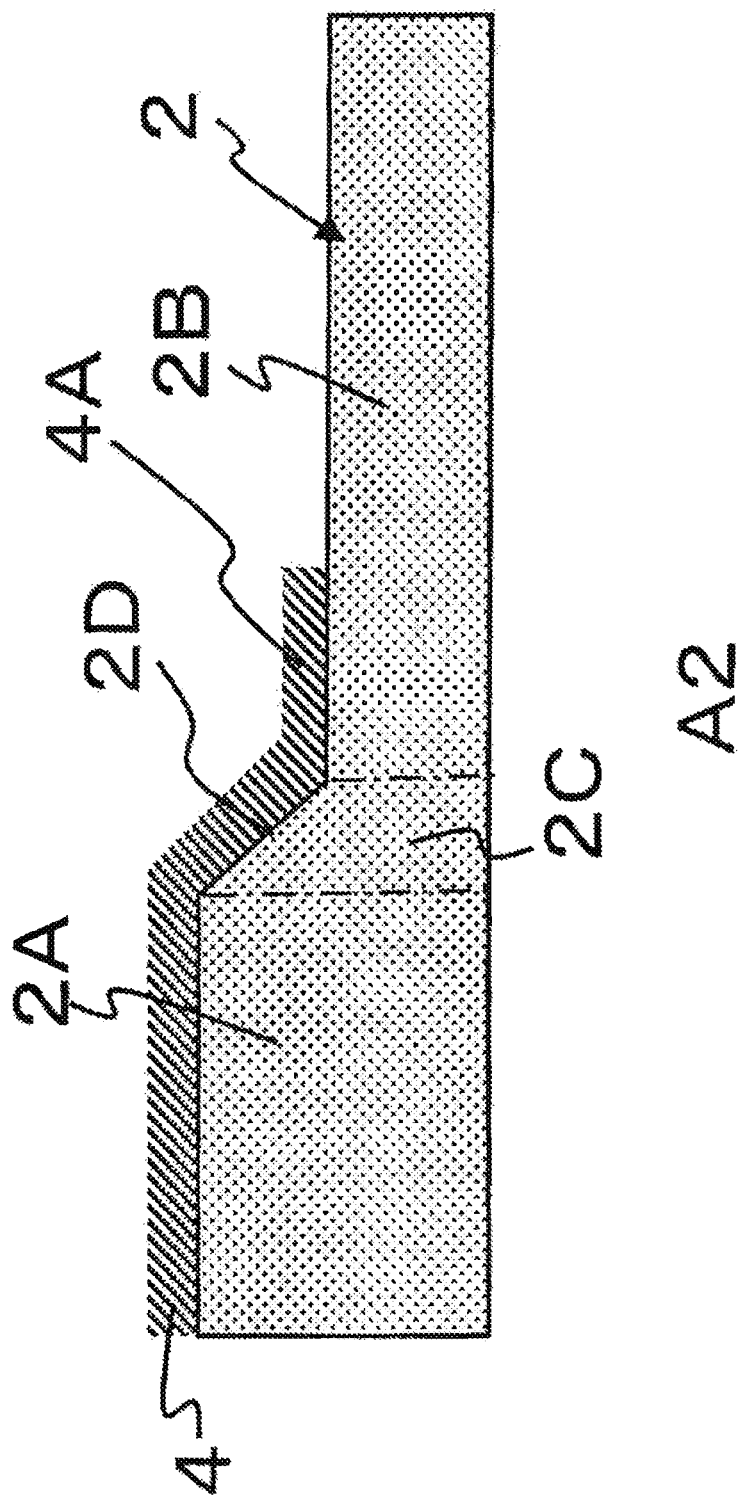

Next, as illustrated in FIG. 3B, a material for an anode electrode is applied on an upper surface of the main body part 2A, the step surface 2D, and the frame part 2B, on the surface of the support plate 2 where the step surface 2D is formed, and the anode electrode layer 4 is formed by burning this. At this time, the support plate 2 is heated with the periphery restricted by a jig (not illustrated).

Figure 3C:
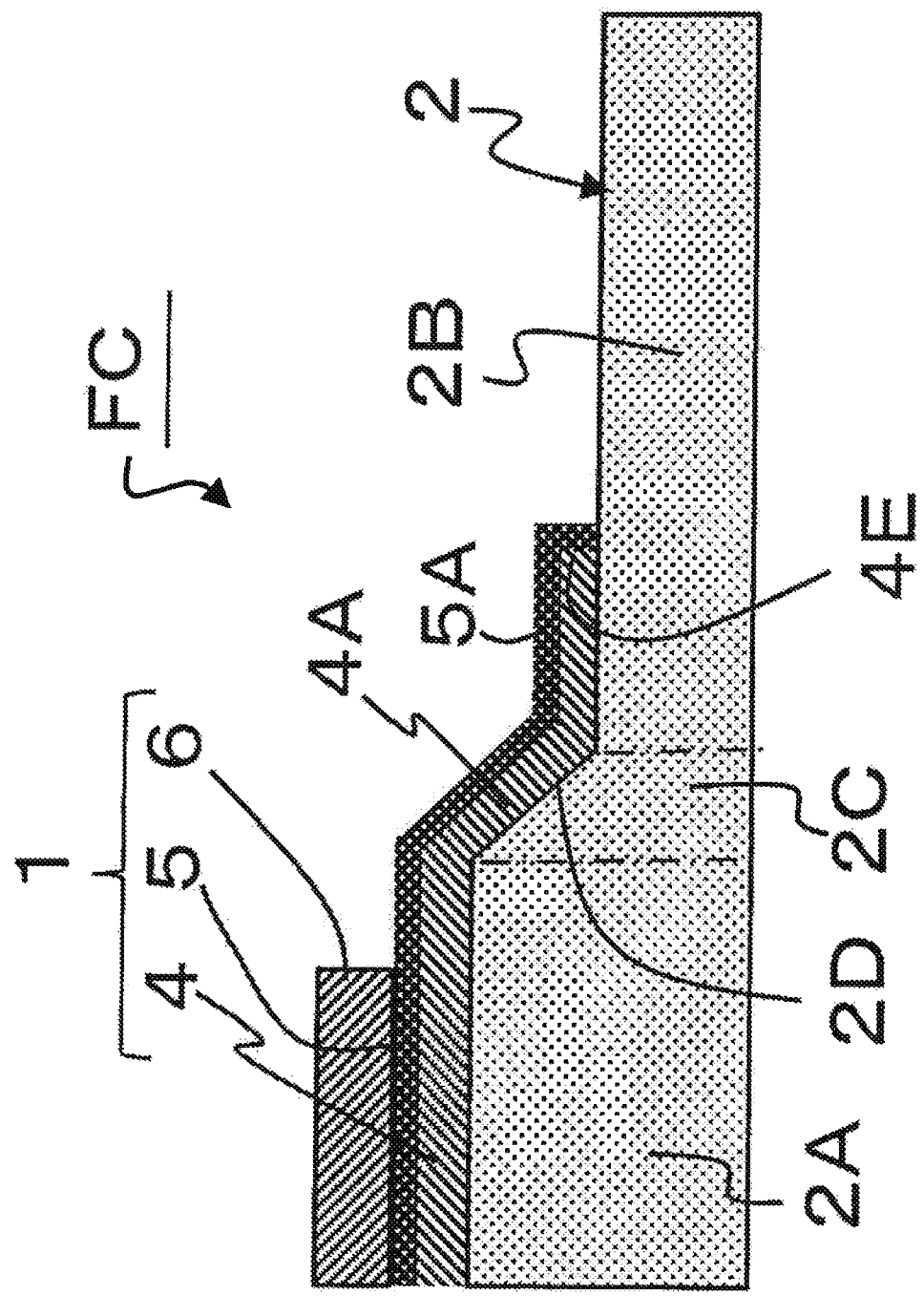
Figure 3D:
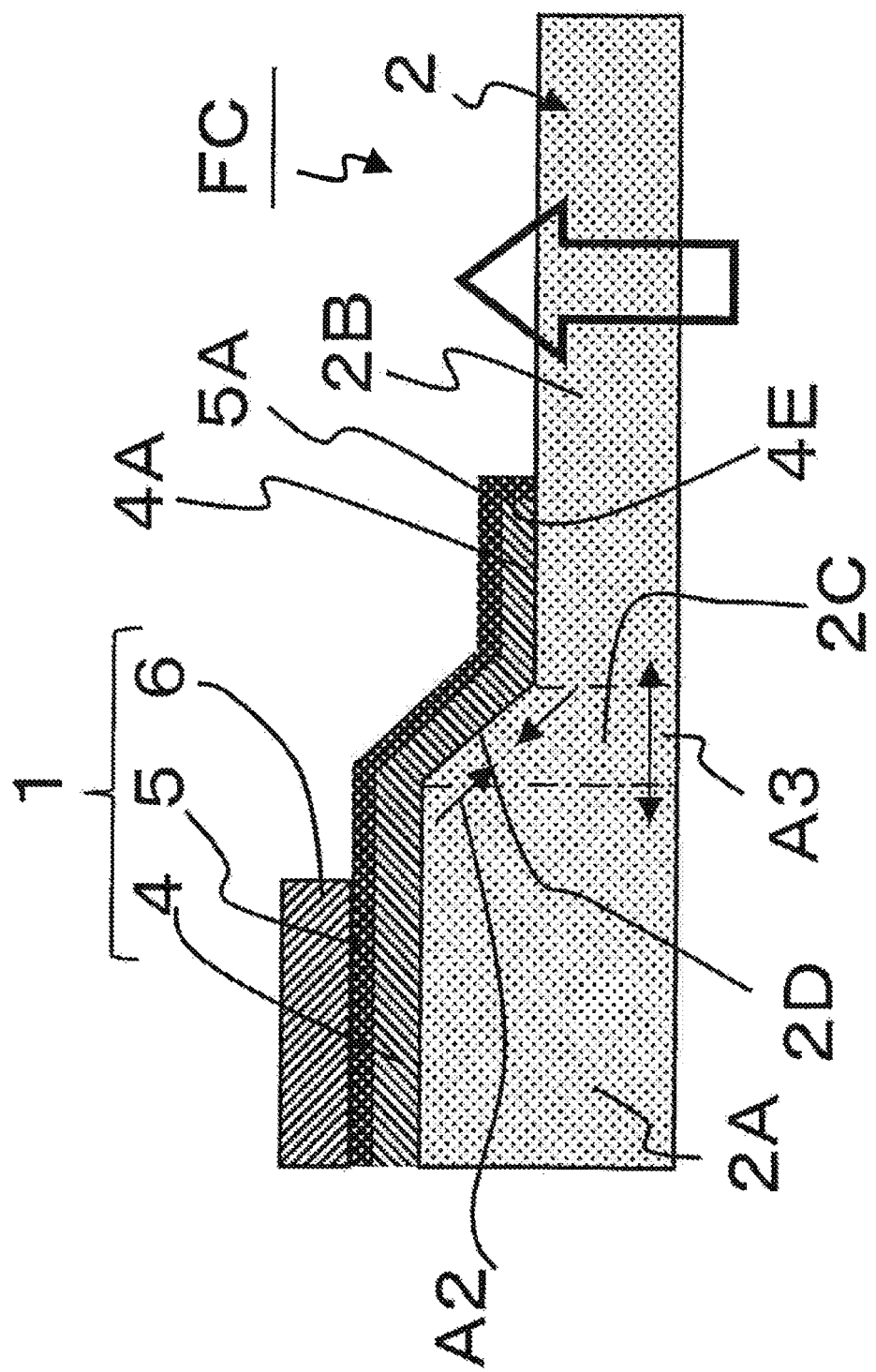

Subsequently, as illustrated in FIG. 3C, an electrolyte layer 5 is formed on an upper surface of the anode electrode layer 4 by sputtering, to cover the anode electrode layer 4 to its peripheral end surface 4E. Thereafter, a material for a cathode electrode is applied on an upper surface in the power generation region G of the electrolyte layer 5, and the cathode electrode layer 6 is formed by burning this. At this time, the support plate 2 is heated with the periphery restricted by a jig in a similar manner as described above. Then, the support plate 2 is cooled and contracts accordingly, whereby the internal stress is reset.

In the fuel battery cell FC that is manufactured through the process described above, the support plate 2 has a large structural change at the intermediate part 2C having the step surface 2D, due to changes in thickness, changes in void fraction (porosity), changes in strength, and heat history during the manufacturing process, and the like. Therefore, the support plate 2 generates heat and thermally expands as a whole during power generation. However, a difference in contraction amount is generated between the surface on the step surface 2D side and the opposite side surface (flat surface) after power generation is stopped.

That is, the support plate 2 has a greater contraction amount on the step surface 2D side than that on the opposite side surface, because the surface area on the step surface 2D side is greater than that of the opposite side surface by the amount of the step surface 2D. As a result, the support plate 2 is displaced (deformed) to curve in a way that the step surface 2D of the intermediate part 2C is on the inner side of the curve, as indicated by a bold arrow in FIG. 3D, in accordance with cooling after power generation is stopped.

This generates a compressive load (arrow A2) on the step surface 2D side of the support plate 2 and generates a tensile load (arrow A3) on the opposite surface, in the fuel battery cell FC. As described above, the electrolyte layer 5 has a relatively low resistance against a tensile load and has a relatively high resistance against a compressive load.

Meanwhile, in the fuel battery cell FC, the battery structure 1 is disposed on the step surface 2D side of the support plate 2 and the electrolyte layer 5 is disposed in a way it extends to the step surface 2D and the frame part 2B having gas impermeability. Therefore, although the compressive load A2 generated in the intermediate part 2C of the support plate 2 is applied to the electrolyte layer 5, the tensile load A3 is not applied thereto. In addition, in the fuel battery cell FC, a gas barrier property is secured at an end part of the battery structure 1 between the electrolyte layer 5 (outer peripheral edge part 5A) and the frame part 2B.

When the fuel battery cell FC generates power, the anode electrode layer 4 also thermally expands in addition to the support plate 2. In this state, the support plate 2 has an asymmetric shape relative to a center line of the thickness and has a volume of the half part having the step surface 2D smaller than the volume of the other half part. Thus, when the entire support plate 2 thermally expands, the support plate 2 is slightly deformed in a way that the step surface 2D is on the inner side of the deformation, and a compressive load is generated in the intermediate part 2C. In this situation, in the fuel battery cell FC, because the battery structure 1 is disposed on the step surface 2D side of the support plate 2, when thermally expanded, a deformation force generated in the anode electrode layer 4 and a deformation force generated in the support plate 2 cancel each other. As a result, a displacement amount of the support plate 2 is greatly reduced.

Thus, in the fuel battery cell FC, when the support plate 2 contracts after power generation is stopped, a risk of application of a tensile load to the electrolyte layer 5 is removed, whereby occurrence of a crack and the like in the electrolyte layer 5 are prevented beforehand, and a good gas barrier property at the end part of the battery structure 1 is maintained.

In the fuel battery cell FC, the support plate 2 is made of a porous metal material, and the frame part 2B is formed by applying pressure to a part of the porous metal material in the thickness direction, to have a dense structure. Due to this, in the fuel battery cell FC, the support plate 2 that integrally has the main body part 2A with gas permeability and the frame part 2B with gas impermeability by using a single material. Thus, it is suitable for mass production.

In the fuel battery cell FC, the thickness of the intermediate part 2C of the support plate 2 continuously reduces in the range from the main body part 2A to the frame part 2B, and the step surface 2D is inclined. Therefore, in the fuel battery cell FC, the structural change in the intermediate part 2C is moderated, and concentration of thermal stress is suppressed.

Moreover, in the fuel battery cell FC, the anode electrode layer 4 of the battery structure 1 has the outer peripheral edge part 4A, which is disposed along the step surface 2D and the frame part 2B, as with the electrolyte layer 5, and the peripheral end surface 4E of the outer peripheral edge part 4A of the anode electrode layer 4 is covered with the outer peripheral edge part 5A of the electrolyte layer 5 at the frame part 2B. Therefore, in the fuel battery cell FC, as described above, a force generated by thermal expansion of the anode electrode layer 4 acts in a direction of canceling the force generated in the intermediate part 2C, thereby the displacement amount of the support plate 2 can be suppressed and the gas barrier property at the end part of the battery structure 1 can be sufficiently secured.

Moreover, in the fuel battery cell FC, the thickness of the anode electrode layer 4 is set such that a thermal expansion amount of the anode electrode layer 4 is equivalent to the thermal expansion amount of the intermediate part 2C of the support plate 2. Therefore, a thermal expansion force of the anode electrode layer 4 and a compressive load of the intermediate part 2C act in a way they cancel each other, thereby displacement of the support plate 2 is suppressed. That is, in the fuel battery cell FC, while a compressive load is applied to the electrolyte layer 5, thermal expansion of the anode electrode layer 4 suppresses displacement of the support plate 2, thereby application of an excessive compressive load to the electrolyte layer 5 is prevented.

Furthermore, in the fuel battery cell FC, the thicknesses of the anode electrode layer 4 is set to be the same in the power generation region G and in the outer peripheral edge part 4A. Therefore, application of an excessive compressive load to the electrolyte layer 5 is prevented, and also concentration of thermal stress due to rapid shape change in the anode electrode layer 4 is prevented.

In addition, in the fuel battery cell FC, the cathode electrode layer 6 of the battery structure 1 is provided to the support plate 2 in the range of the main body part 2A. That is, in the fuel battery cell FC, the cathode electrode layer 6 having a large thermal expansion rate is provided only in the power generation region G of the battery structure 1, thereby preventing displacement of the cathode electrode layer 6 due to thermal expansion from affecting the intermediate part 2C (step surface 2D). Thus, a load to be applied to the end part of the battery structure 1 is reduced.

FIGS. 4 to 7 illustrate second to fourth embodiments of the fuel battery cell of the present invention. In the following embodiments, the same constitutional parts as those of the first embodiment are denoted by the same reference signs, and detailed descriptions thereof are omitted.

Second Embodiment

Figure 4:
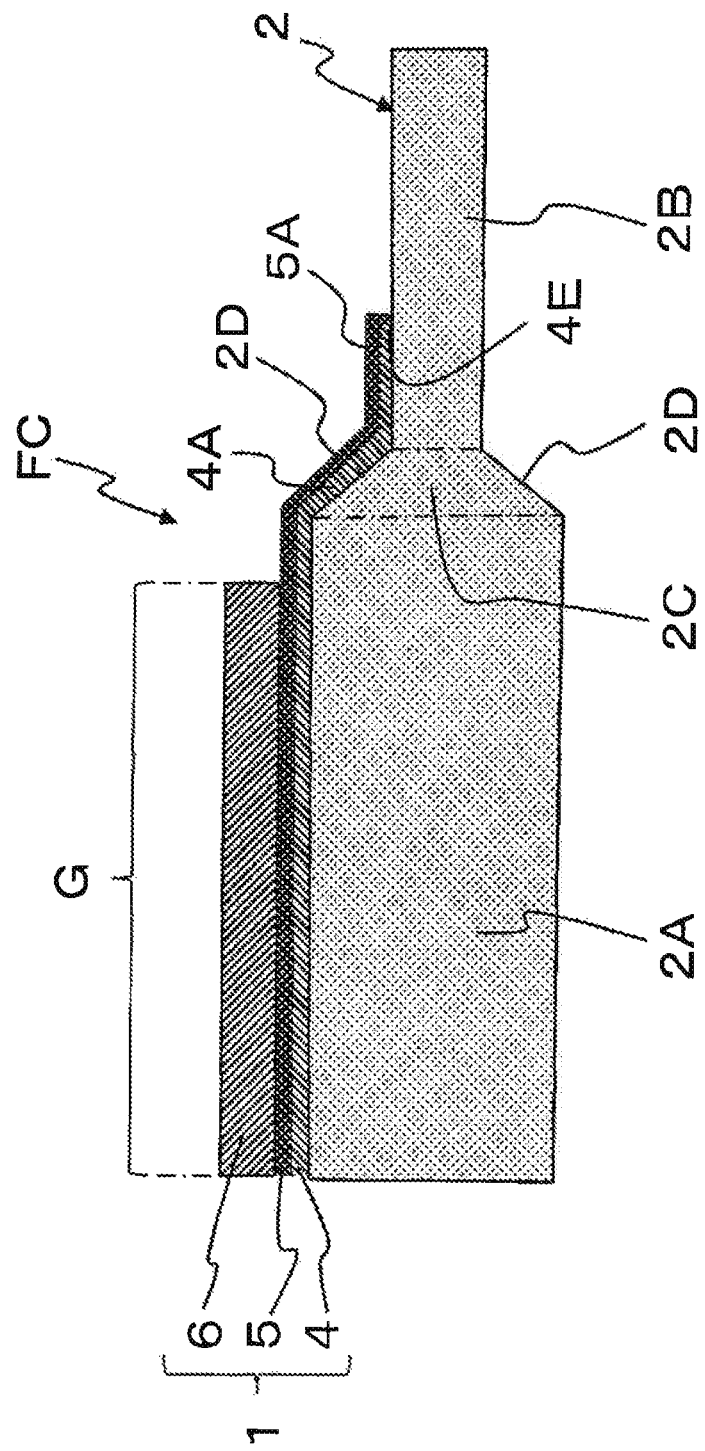
FIG. 4 is a sectional view of a main body part for illustrating a second embodiment of the fuel battery cell of the present invention.

The fuel battery cell FC illustrated in FIG. 4 has step surfaces 2D, 2D formed by the change of the thickness of the intermediate part 2C, on both surfaces of the support plate 2. That is, the support plate 2 of this embodiment has a symmetric shape with respect to the center line of the thickness.

In this fuel battery cell FC, it is unlikely that the support plate 2 is displaced in the thickness direction, when the support plate 2 thermally expands during power generation or the support plate 2 contracts after the power generation is stopped, because the support plate 2 has a symmetric shape with respect to the center line of the thickness. Thus, in the fuel battery cell FC, a risk of application of a tensile load to the electrolyte layer 5 is removed, whereby occurrence of a crack and the like in the electrolyte layer 5 are prevented beforehand, and a good gas barrier property at the end part of the battery structure 1 is maintained.

Third Embodiment

Figure 5:
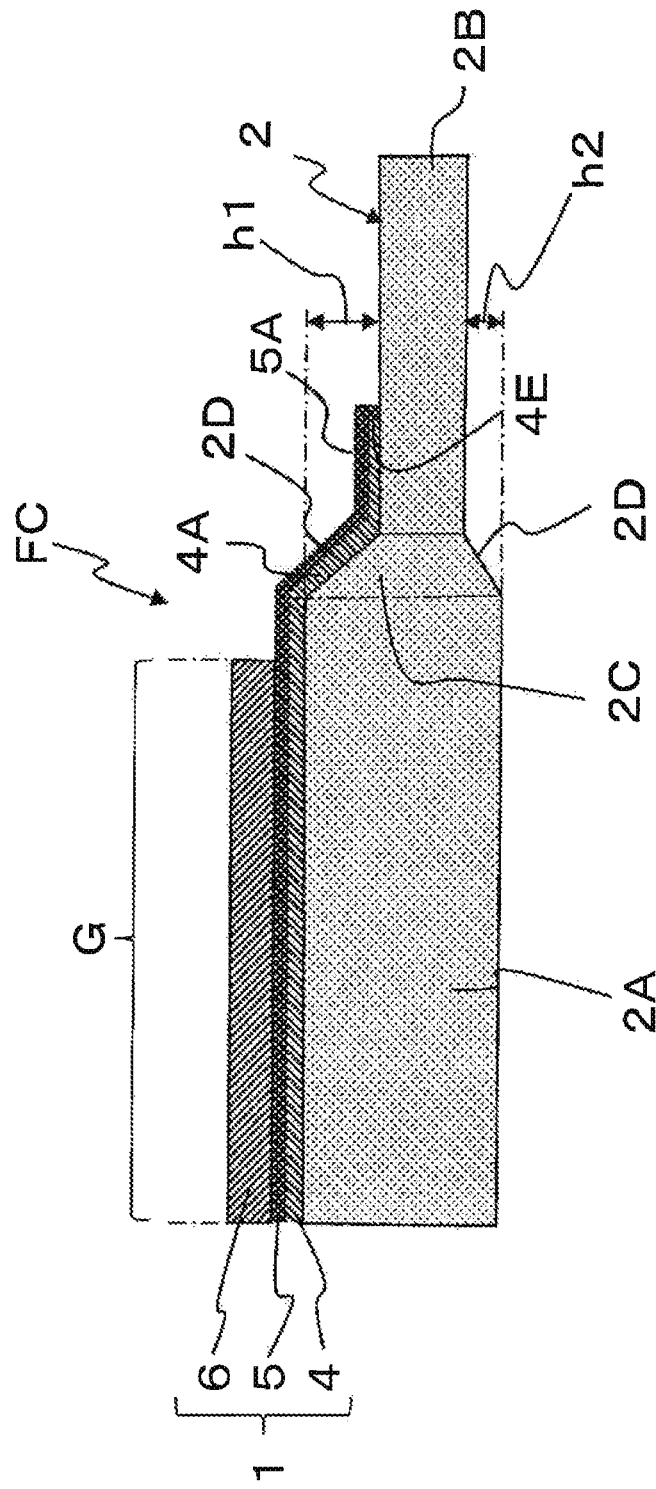
FIG. 5 is a sectional view of a main body part for illustrating a third embodiment of the fuel battery cell of the present invention.

The fuel battery cell FC illustrated in FIG. 5 has step surfaces 2D, 2D on both surfaces of the support plate 2. In this fuel battery cell FC, a step size h2 between the main body part 2A and the frame part 2B on the opposite surface side is smaller than a step size h1 between the main body part 2A and the frame part 2B on the surface where the battery structure 1 is disposed.

That is, the support plate 2 of this embodiment has an asymmetric shape with respect to the center line of the thickness, and although both of the step surfaces 2D, 2D are inclined, the area of the step surface 2D on the surface where the battery structure 1 is disposed is greater than the area of the step surface 2D on the opposite side, due to the difference between the step sizes h1 and h2.

In this fuel battery cell FC, both of the contraction displacement of the support plate 2 after power generation is stopped and the thermal expansion of the support plate 2 and the anode electrode layer 4 are taken into consideration. That is, when the support plate 2 contracts after power generation is stopped, a contraction amount on the step surface 2D side having the large step size h1 is greater than the contraction amount on the step surface 2D side having the small step size h2, due to the difference in the surface areas. Thus, the support plate 2 is displaced to curve in a way that the step surface 2D with the large step size h1 is on the inner side of the curve, whereby a compressive load is applied to the inner inside of the curve, while a tensile load is applied to the outer side of the curve.

In these conditions, in the fuel battery cell FC, because the battery structure 1 is disposed on the step surface 2D side having the large step size h1, a tensile load is not applied to the electrolyte layer 5 when the support plate 2 contracts after power generation is stopped. In this fuel battery cell FC, the thermal expansion force of the anode electrode layer 4 and the compressive load generated in the intermediate part 2C are balanced and they act in a way they cancel each other, thereby displacement of the support plate 2 is suppressed. Due to this, in the fuel battery cell FC, a risk of application of a tensile load to the electrolyte layer 5 is removed, whereby occurrence of a crack and the like in the electrolyte layer 5 are prevented beforehand, and a good gas barrier property at the end part of the battery structure 1 is maintained.

Fourth Embodiment

Figure 6:
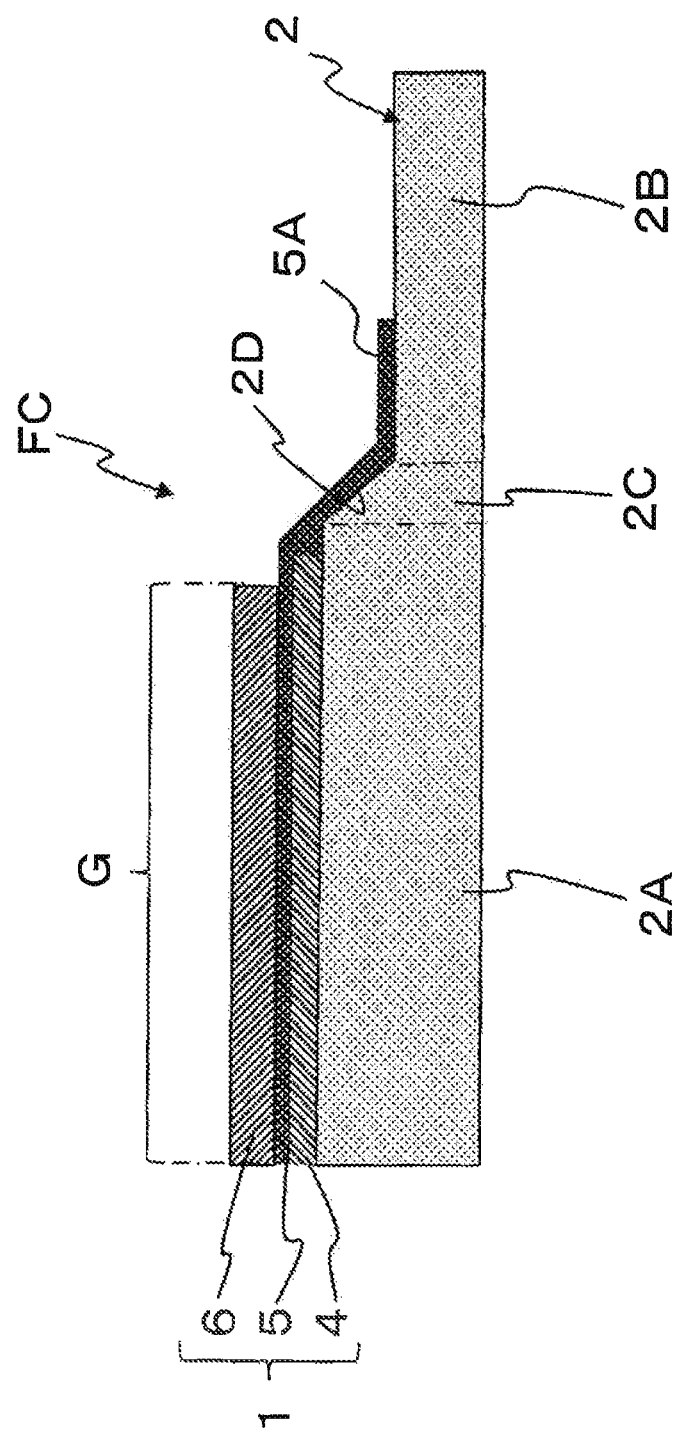
FIG. 6 is a sectional view of a main body part for illustrating a fourth embodiment of the fuel battery cell of the present invention.

The fuel battery cell FC illustrated in FIG. 6 differs from the fuel battery cell FC in the first embodiment (refer to FIGS. 2A and 2B) in that only the electrolyte layer 5 has the outer peripheral edge part 5A and is disposed in a way it extends to the frame part 2B, whereas the anode electrode layer 4 and the electrolyte layer 5 respectively have the outer peripheral edge parts 4A, 5A in the first embodiment.

Also in this fuel battery cell FC, a risk of application of a tensile load to the electrolyte layer 5 is removed, when the support plate 2 contracts after power generation is stopped, whereby occurrence of a crack and the like in the electrolyte layer 5 are prevented beforehand, and a good gas barrier property at the end part of the battery structure 1 is maintained. Further advantage is that it is not necessary to consider thermal expansion of the anode electrode layer 4.

Fifth Embodiment

Figure 7:
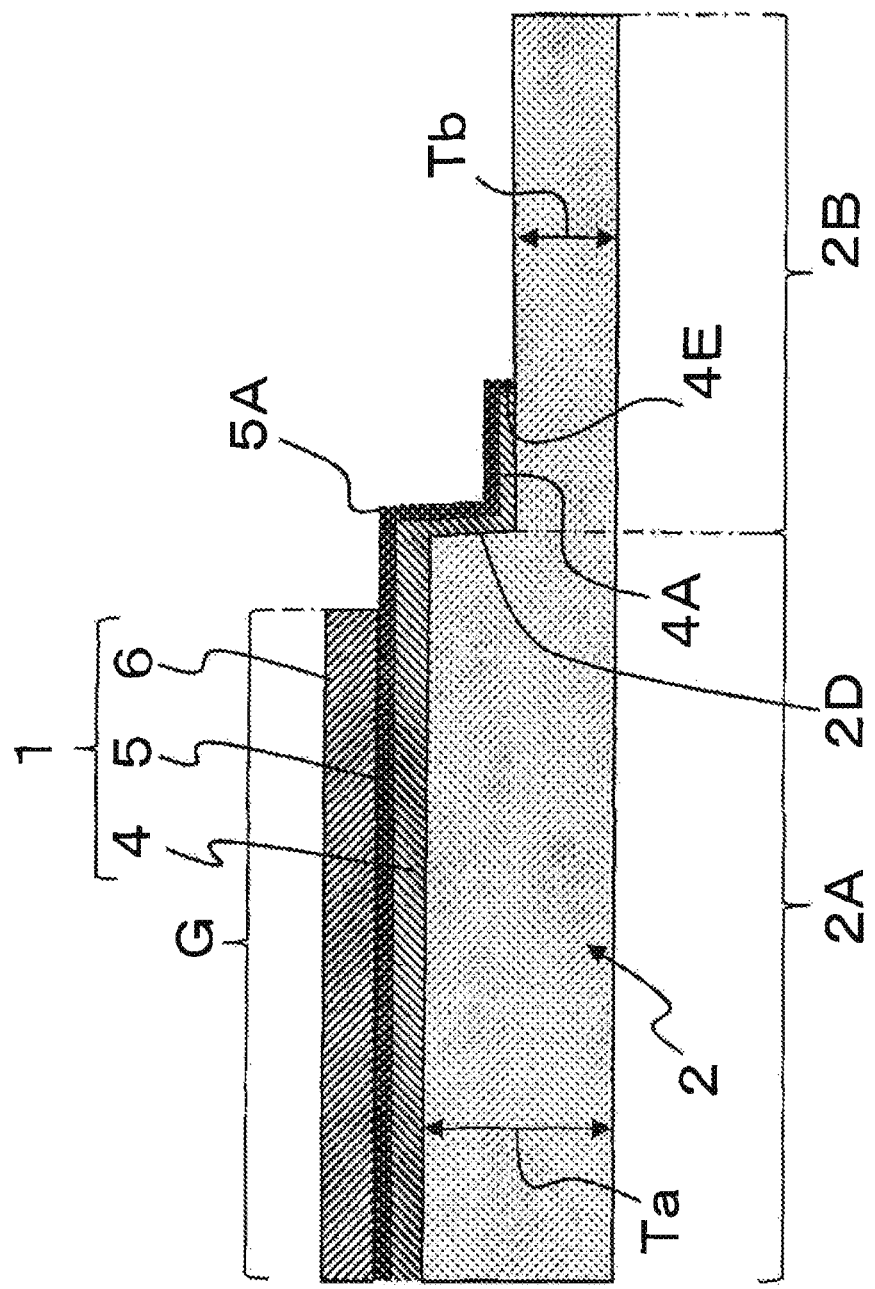
FIG. 7 is a sectional view of a main body part for illustrating a fifth embodiment of the fuel battery cell of the present invention.

The fuel battery cell FC illustrated in FIG. 7 does not have the intermediate part 2C, whereas in the foregoing embodiments the support plate 2 has the intermediate part 2C and the step surface 2D. That is, the support plate 2 has a step surface 2D orthogonal in an in-plane direction between the main body part 2A and the frame part 2B that is thinner than the main body part 2A. Although the step surface 2D illustrated in the figure is orthogonal in the in-plane direction, the step surface 2D may have a slight inclination and may have a round corner.

Also in this fuel battery cell FC, when the support plate 2 contracts after power generation is stopped, the support plate 2 is deformed to curve in a way that the step surface 2D is on the inner side of the curve, because the surface area on the step surface 2D side is greater than that of the opposite side surface by the amount of the step surface 2D. In the fuel battery cell FC, the battery structure 1 is disposed on the step surface 2D side, and therefore a risk of application of a tensile load to the electrolyte layer 5 is removed, when the support plate 2 contracts after power generation is stopped, whereby occurrence of a crack and the like in the electrolyte layer 5 are prevented beforehand. In addition, in this fuel battery cell FC, a good gas barrier property at the end part of the battery structure 1 is maintained.

The configuration of the fuel battery cell according to the present invention is not limited only to those in the foregoing embodiments but can be modified or changed appropriately within the gist of the present invention, or the configurations of each of the foregoing embodiments can be combined.

REFERENCE SIGNS LIST

FC Fuel battery cell
G Power generation region
h1, h2 Step size
Ta Thickness of main body part
Tb Thickness of frame part
1 Battery structure
2 Support plate
2A Main body part
2B Frame part
2C Intermediate part
2D Step surface
4 Anode electrode layer
4A Outer peripheral edge part of anode electrode layer
4E Peripheral end surface of anode electrode layer
5 Electrolyte layer
5A Outer peripheral edge part of electrolyte layer
6 Cathode electrode layer

The invention claimed is:

1. A fuel battery cell comprising a battery structure and a support plate,
    the battery structure having a power generation region of a lamination of an anode electrode layer, an electrolyte layer, and a cathode electrode layer, and
    the support plate being made of metal and being disposed on the anode electrode layer side of the battery structure to support the battery structure,
    wherein
    the support plate integrally includes a main body part at a center and a frame part at an outer periphery of the main body part, the main body part having gas permeability and being in contact with the power generation region of the anode electrode layer, the frame part having gas impermeability and having relatively a smaller thickness than a thickness of the main body part,
    the support plate has a step surface between the main body part and the frame part, on a surface on the anode electrode layer side, and
    the electrolyte layer of the battery structure is disposed in a way it extends to an outer periphery side of the power generation region and reaches the step surface and the frame part.

2. The fuel battery cell according to claim 1, wherein the support plate has an intermediate part whose thickness continuously reduces from the main body part to the frame part, and the step surface is inclined from the main body part to the frame part.

3. The fuel battery cell according to claim 1, wherein the anode electrode layer of the battery structure includes an outer peripheral edge part that is disposed in a way it extends to the outer periphery side of the power generation region along the step surface and the frame part, and the electrolyte layer covers the outer peripheral edge part of the anode electrode layer, and its peripheral end surface.

4. The fuel battery cell according to claim 3, wherein the support plate has an intermediate part whose thickness continuously reduces from the main body part to the frame part, the step surface is inclined from the main body part to the frame part, and
    the thickness of the anode electrode layer is set such that a thermal expansion amount of the anode electrode layer is equivalent to a thermal expansion amount of the intermediate part.

5. The fuel battery cell according to claim 3, wherein the thicknesses of the anode electrode layer are the same in the power generation region and in the outer peripheral edge part thereof.

6. The fuel battery cell according to claim 1, wherein the cathode electrode layer is provided in a range of the main body part with respect to the support plate.

7. The fuel battery cell according to claim 1, wherein the support plate has the step surface on both surfaces, the both surfaces are a surface on which the battery structure is disposed and a surface opposite to the surface on which the battery structure is disposed, and a step size between the main body part and the frame part on the surface opposite to the surface on which the battery structure is disposed, is smaller than a step size between the main body part and the frame part on the surface on which the battery structure is disposed.

8. The fuel battery cell according to claim 4, wherein the thicknesses of the anode electrode layer are the same in the power generation region and in the outer peripheral edge part thereof.

9. The fuel battery cell according to claim 2, wherein the anode electrode layer of the battery structure includes an outer peripheral edge part that is disposed in a way it extends to the outer periphery side of the power generation region along the step surface and the frame part, and the electrolyte layer covers the outer peripheral edge part of the anode electrode layer, and its peripheral end surface.

10. The fuel battery cell according to claim 2, wherein the cathode electrode layer is provided in a range of the main body part with respect to the support plate.

11. The fuel battery cell according to claim 2, wherein the support plate has the step surface on both surfaces, the both surfaces are a surface on which the battery structure is disposed and a surface opposite to the surface on which the battery structure is disposed, and a step size between the main body part and the frame part on the surface opposite to the surface on which the battery structure is disposed, is smaller than a step size between the main body part and the frame part on the surface on which the battery structure is disposed.

* * * * *